E. ROSENFELD.
TRUCK.
APPLICATION FILED OCT. 14, 1909.

960,407.

Patented June 7, 1910.
2 SHEETS—SHEET 1.

Witnesses
James F. Crown
E. M. Ricketts

Inventor
Edward Rosenfeld
By Watson E. Coleman
Attorney

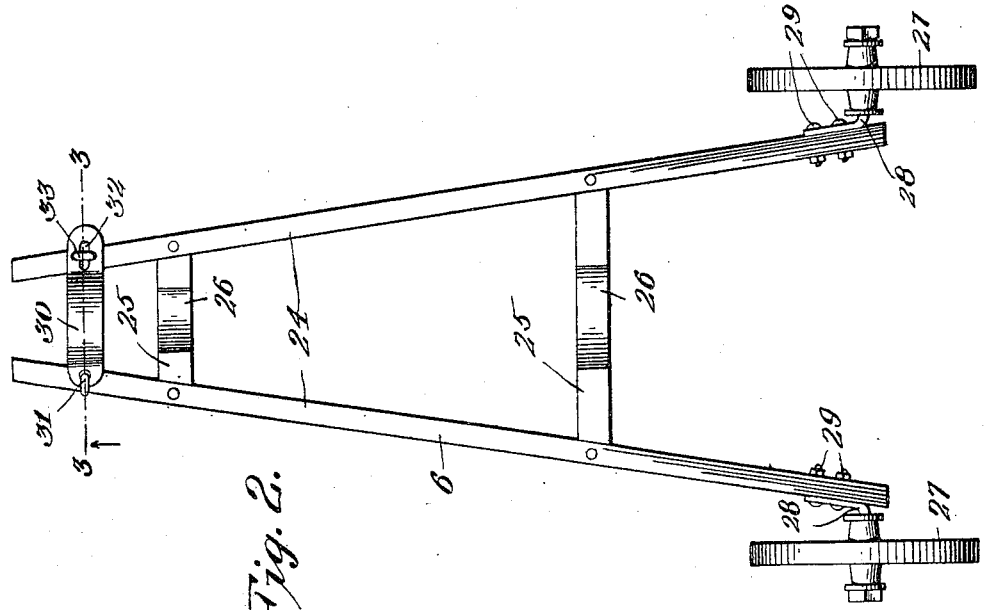

UNITED STATES PATENT OFFICE.

EDWARD ROSENFELD, OF COLUMBUS, OHIO.

TRUCK.

960,407.

Specification of Letters Patent. Patented June 7, 1910.

Application filed October 14, 1909. Serial No. 522,631.

*To all whom it may concern:*

Be it known that I, EDWARD ROSENFELD, a citizen of the United States, residing at Columbus, in the county of Franklin and State of Ohio, have invented certain new and useful Improvements in Trucks, of which the following is a specification, reference being had to the accompanying drawings.

This invention has relation to certain new and useful improvements in trucks and more particularly to transporting trucks for wheeled plows and like agricultural implements.

Another object is to provide a transporting truck which is adapted to be positioned beneath the beam of a plow to support the same.

A further object is to provide means carried by the rear truck to securely retain the plow beam thereon and permit of its rotation upon the forward truck as it is lifted into position upon the rear truck.

With these and other objects in view, the invention consists of the novel construction, combination and arrangement of parts hereinafter fully described and claimed, and illustrated in the accompanying drawings, in which—

Figure 1:
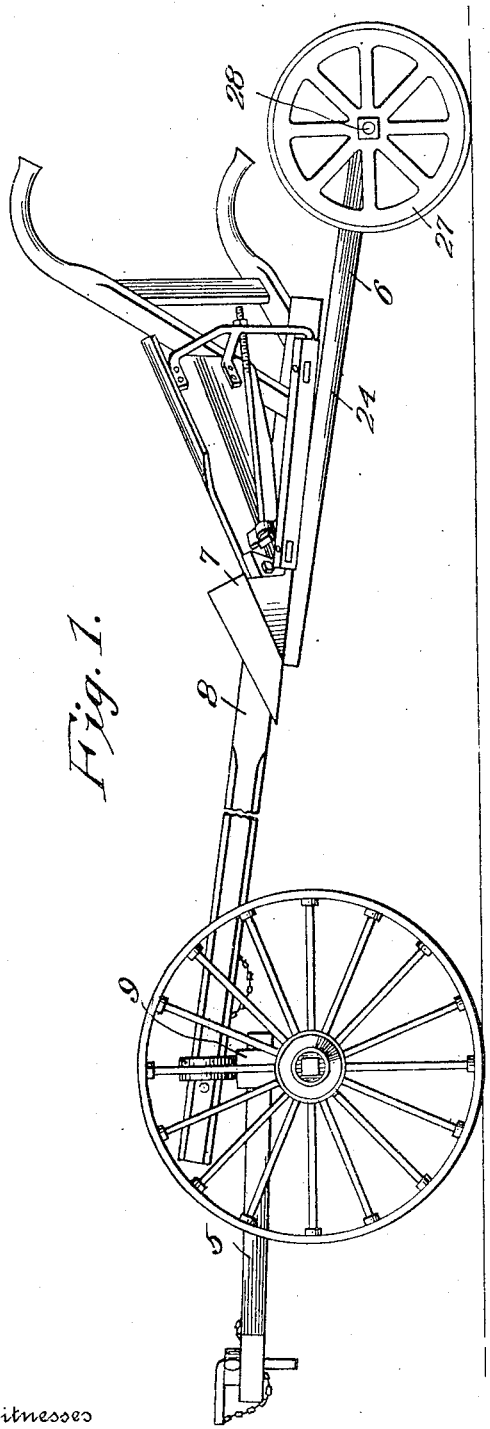
Figure 3:
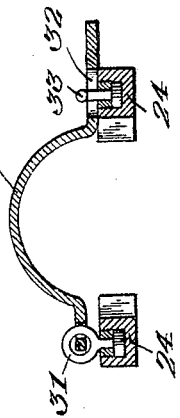

Figure 1 is a side elevation showing a plow and beam supported upon the wheeled trucks embodying my improvements; Fig. 2 is a top plan view of the rear truck; Fig. 3 is a section taken on the line 3—3 of Fig. 2.

This invention is devised with a view to providing a suitable transporting truck for plows and like agricultural implements similar to that set forth in my prior application for patent on an improved plow filed September 11, 1909, Serial No. 517,202, whereby the plow may be readily transported from place to place.

In the above mentioned application there is shown a plow beam upon one end of which the mold board and plow share are reversibly mounted, or in other words, may be swung to opposite sides of the plow beam whereby it may be utilized as a hillside plow. The pivotal movement of the plow with relation to the beam is limited and for the purpose of conveniently moving the plow from place to place I provide the front and rear supporting trucks 5 and 6, respectively, the rear truck being adapted to receive one end of the beam together with the plow, which after being disposed upon one side of the beam is elevated or swung upon the rear truck, the beam rotating upon the forward supporting truck during this movement of the plow.

In the accompanying drawings a plow 7 is illustrated which is of similar construction to that shown and described in the aforesaid application and will not here be set forth in detail. This plow is pivotally supported from the rear end of the beam 8 which has its forward end supported upon the transverse bolster 9 of the forward supporting truck 5. When in operative position the plow 7 is adapted to depend from the rear end of the beam 8.

When it is desired to move the plow from one point in the field to another, the rear transporting truck 6 is utilized and the beam and plow lifted bodily and positioned upon the truck. This truck is considerably longer than the forward truck 5 and extends to a point adjacent to the longitudinal center of the plow beam. In its construction the truck 6 comprises the longitudinal converging side bars 24 which are connected by the transverse bars 25, each of which is formed with a central concave portion 26 to provide a seat for the plow beam. Upon the rear ends of each of the side bars the truck wheels 27 are mounted. As shown in the drawings the trunnions 28 upon which these wheels revolve, have their inner ends angularly extended and secured to the side bars of the truck frame by means of suitable bolts 29. At a point adjacent to the outer ends of the bars 24 a yoke 30 is transversely positioned. This yoke has its ends laterally extended, one of said ends being perforated to receive an eye 31 which is secured in one of the side bars 24. The other end of the yoke is formed with a longitudinal slot 32 through which a key 33 is adapted to extend. This key is pivoted in the side bar of the frame and is adapted to be turned at right angles to the slot to prevent the lifting of the yoke, thus preventing its swinging movement and retaining the beam in position on the truck. After the plow and beam have been lifted and placed in the central concavities 26 of the transverse bars 25 the yoke 30 is placed over the beam and secured in position by means of the pivoted key 33. It will be noted that the wheels of the rear transporting truck are much smaller in diameter than those of the forward truck thus disposing the plow beam at an inclination thus obviating the necessity of lifting the plow and beam to a considerable height above the ground when placing the same on the truck. The plow may now be rapidly moved to the point where the work is to be continued, and the rear truck removed, when the plowing operation may be continued as before described.

From the foregoing it will be seen that I have provided a plow truck of very simple construction which is adapted to support the plow when being transported from place to place. It will be obvious that the truck is adapted for a large number of useful purposes, and I therefore do not wish to limit myself to the particular use above set forth. Many minor modifications may also be resorted to within the scope of the claims without departing from the essential features or sacrificing any of the advantages of the invention.

Having thus described the invention, what is claimed is:

1. A transporting truck for plows comprising longitudinally extending converging side bars, a traction wheel revolubly mounted on the rear end of each of said bars to support the same, transverse connecting bars between the side bars adapted to provide a seat for the plow beam, a yoke carried by one of the side bars adapted to embrace said beam, said yoke being secured at one of its ends, the free end of said yoke being laterally extended and provided with a longitudinal slot, and a key pivotally secured to the other of the side bars adapted to be positioned through said slot to secure said yoke upon the beam, substantially as and for the purpose set forth.

2. A transporting truck of the character described comprising converging side bars having transversely extending trunnions on their rear ends, traction wheels revolubly mounted on said trunnions, transverse connecting bars between the side bars, each of said transverse bars having a central concavity adapted to provide a seat for the plow beam and prevent the transverse shifting movement thereof, a yoke adapted to embrace the beam and having its ends laterally extended, one end of said yoke being pivotally secured in an eye fastened to one of the side bars, the opposite end of said yoke being provided with a longitudinal slot, and a key pivotally secured to the other of the side bars adapted to extend through said slot and to be turned at right angles thereto to secure the yoke upon the beam, substantially as and for the purpose set forth.

In testimony whereof I hereunto affix my signature in the presence of two witnesses.

EDWARD ROSENFELD.

Witnesses:
 JOSEPH LANDA,
 HARRY C. WILSON.